June 30, 1925.
H. A. BARSCHOW
THERMOSTATIC REGULATOR FOR OVENS
Filed Aug. 22, 1922     3 Sheets-Sheet 1
1,543,744
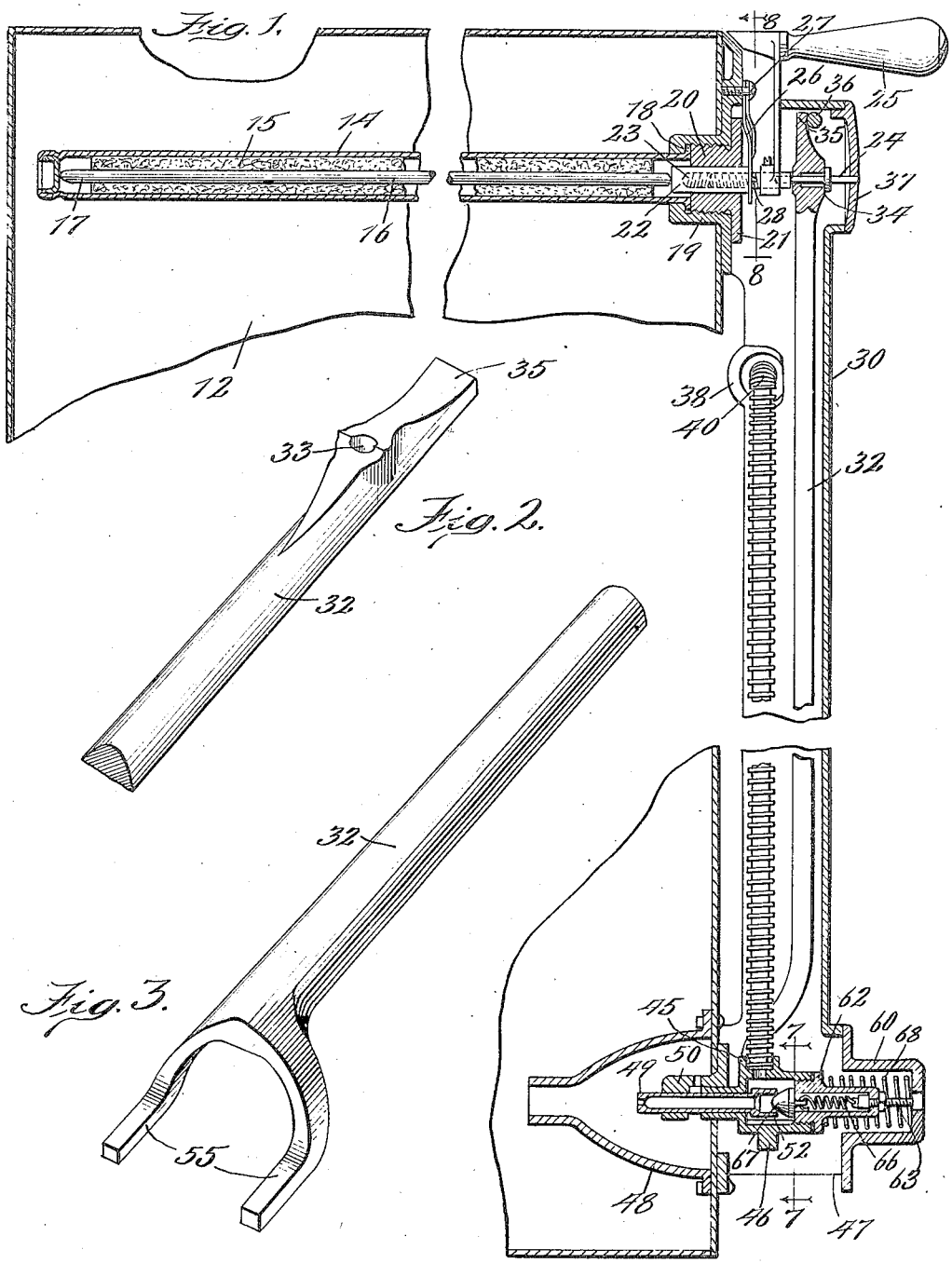

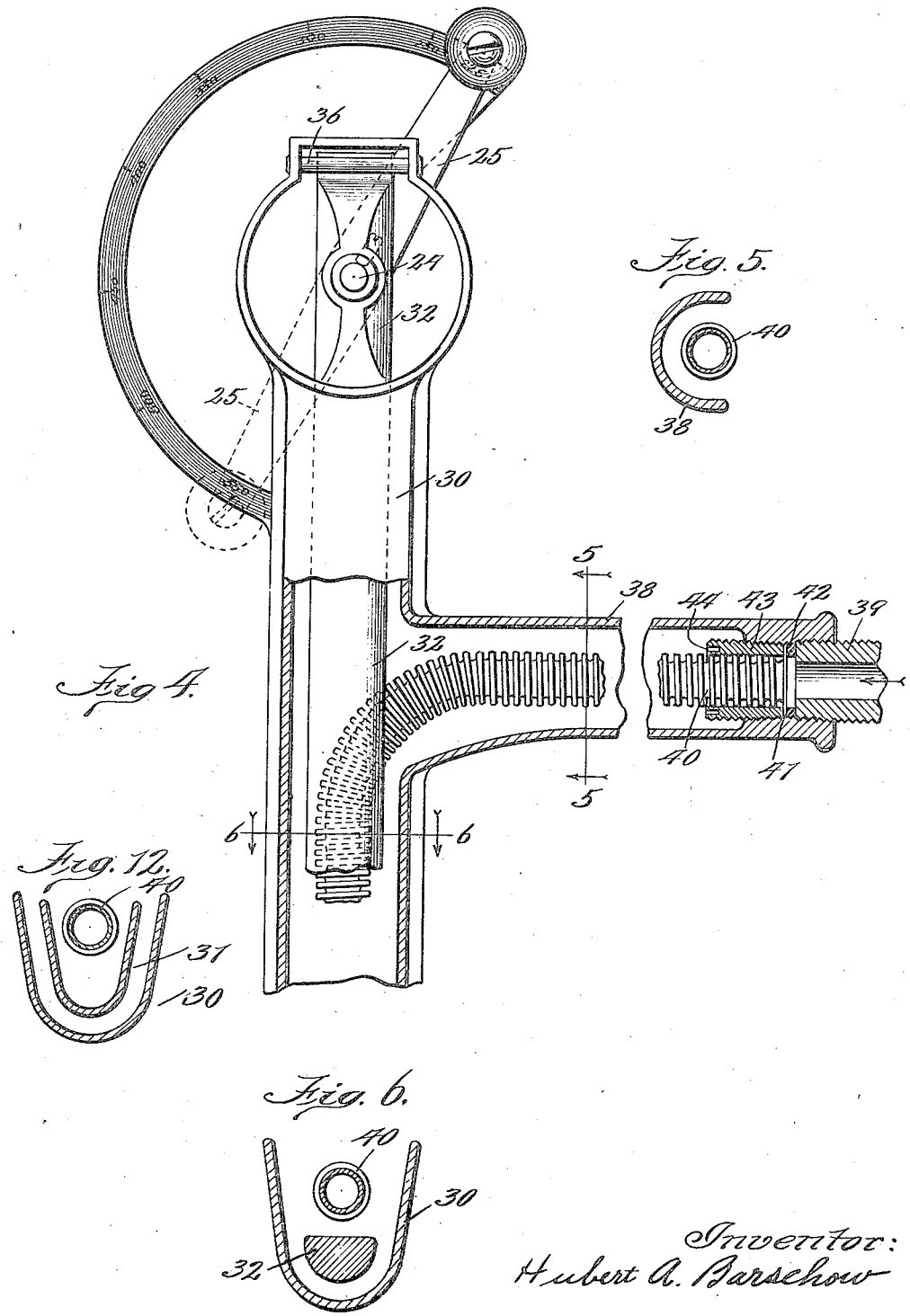

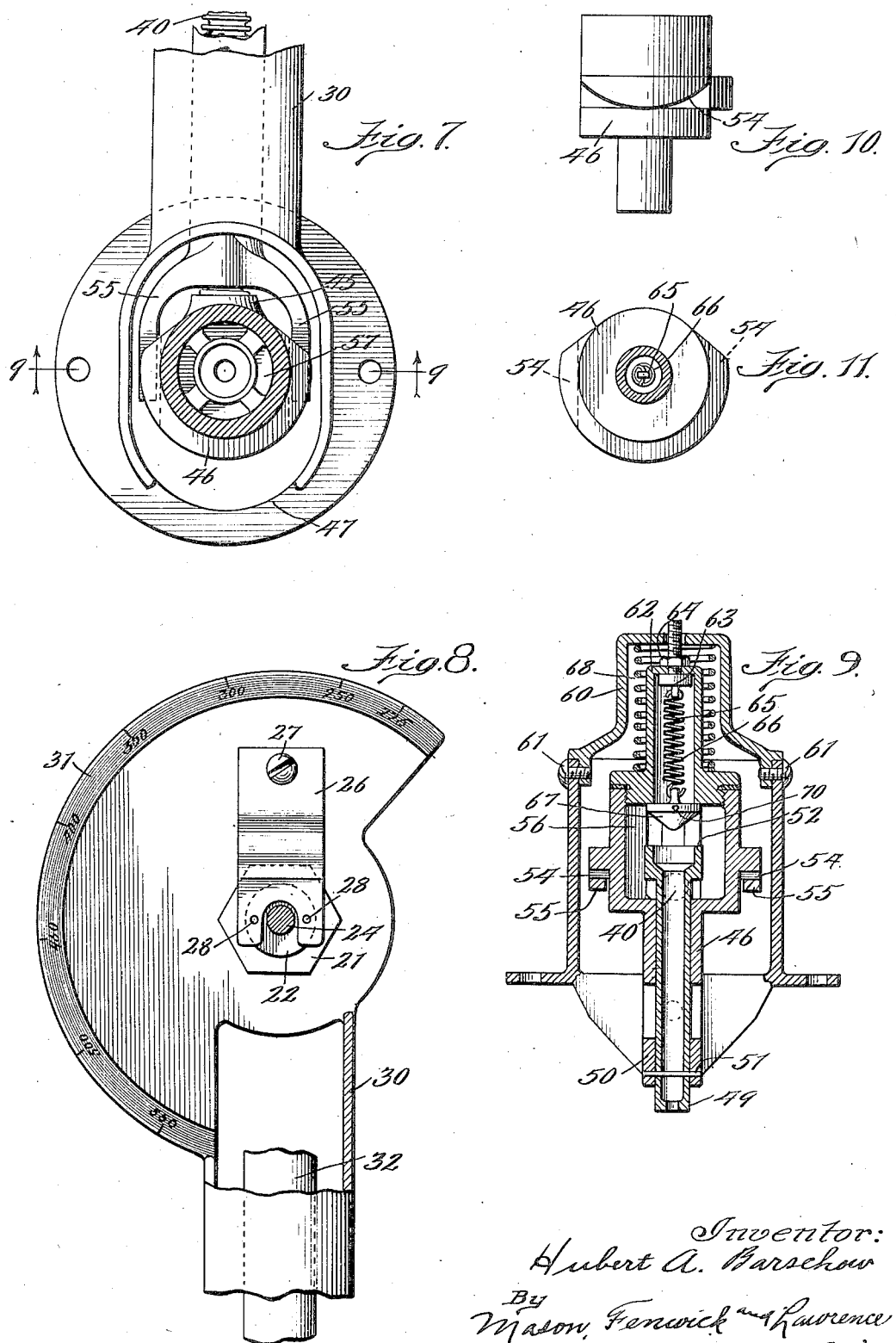

Patented June 30, 1925.

1,543,744

UNITED STATES PATENT OFFICE.

HUBERT A. BARSCHOW, OF LAPORTE, INDIANA, ASSIGNOR TO RUDOLPH HOFFMAN, OF CLEVELAND, OHIO.

THERMOSTATIC REGULATOR FOR OVENS.

Application filed August 22, 1922. Serial No. 583,662.

*To all whom it may concern:*

Be it known that I, HUBERT A. BARSCHOW, a citizen of the United States, residing at Laporte, in the county of Laporte and State of Indiana, have invented certain new and useful Improvements in Thermostatic Regulators for Ovens; and I do hereby declare the following to be a full, clear, and exact description of the invention, such as will enable others skilled in the art to which it appertains, to make and use the same.

This invention relates to improvements in thermostatic gas cutoffs for baking ovens, water heaters, or the like, and has for its principal object the provision of such a thermostatic gas cutoff provided with means whereby any predetermined temperature can be attained and automatically maintained.

An important object of this invention is the provision of a thermostatic attachment for baking ovens which will automatically cut off the gas supply to the oven when the same has reached a certain temperature, whereby it is allowed to cool, and after it has been sufficiently cooled, the gas is again automatically turned on to bring the oven up to the desired temperature, which temperature can be regulated as desired.

Another important object of this invention is the provision of a thermostatic element for heating devices, provided with means whereby any predetermined temperature can be attained and maintained within a close range by an automatic regulation of the fuel supply to the heating element.

One of the important objects of this invention is the provision of a thermostatic fuel regulating device for gas ovens provided with a manually operated means, whereby any predetermined temperature can be attained as desired, and which will not be liable to become out of order or inaccurate through continued or even careless use.

A further object of this invention is the provision of a thermostatic tube for use with gas ovens or the like, and a connection therebetween which will maintain the tube in working relation with the remainder of the thermostatic regulator at all times regardless of the continual expansion and contraction occurring in said regulator, and which will be proof against the most severe usage by careless and inexperienced persons; and the further provision of an open housing for the device whereby condensation of gas and formation of scale will be avoided, with the consequent annoyances, and the necessity of stopping boxes will be eliminated.

Still another important object of this invention is the provision in a thermostatic cutoff for gas ovens or the like, of a valve for regulating the flow of gas which shall be adapted to automatically seat itself at all positions of operation, and which will consequently be leak-proof and trouble-proof.

Other further important objects of the invention will be apparent from the disclosures in the accompanying drawings and the following specification.

The invention, in a preferred form, is illustrated in the drawings, and hereinafter more fully described.

In the drawings:

Fig. 1 is a vertical section showing the main portions of the improved device of this invention.

Figs. 2 and 3 are respectively the top and bottom ends, in perspective of the thermostatically operated lever of the device.

Fig. 4 is a vertical view partly in section, taken at a right angle to the showing in Fig. 1, and illustrating the flexible fuel conducting means.

Fig. 5 is a sectional view taken on the line 5—5 of Fig. 4.

Fig. 6 is a sectional view taken on the line 6—6 of Fig. 4.

Fig. 7 is a sectional view of the valve at the bottom of the device, taken upon the line 7—7 of Fig. 1, looking in the direction indicated by the arrows, parts being omitted.

Fig. 8 is a section taken on the line 8—8 of Fig. 1, looking in the direction indicated.

Fig. 9 is a sectional view on the line 9—9 of Fig. 7.

Figs. 10 and 11 are side and end views respectively showing one of the valve elements.

Fig. 12 is a sectional view similar to Fig. 6, showing a slight modification.

As shown in the drawings:

The reference numeral 12 indicates generally an oven or other heating means, the temperature of which can be predetermined and automatically controlled by the improved device of this invention. This consists primarily of a thermostat element comprising a tube 14, of copper or other readily expansible metal, which extends into the oven and preferably across the width thereof. Extending axially through the copper tube 14 is a rod of porcelain or other suitable material 15 maintained in position by means of packing 15, and having one end, as 17, securely affixed to the end of the copper tube 14, so that as the tube is expanded longitudinally by heat, the porcelain or non-expansible element 16 will be drawn back therewith. The other end of the tube 14 is flanged, as shown at 18, and extends inwardly into the oven through an opening in a cylindrical boss 19 forming part of the thermostat frame. The inner face of the boss 19 is screw-threaded and adapted to be fitted therein and against the flange 18 is a suitable retaining plug 20 with an integral hexagonal nut face 21.

The plug 20 is bored axially with a cylindrical opening adapted to permit of the ready sliding therethrough of a pin or the like 22, having one end adapted to abut against the corresponding end of the thermostat member 16. The pin 22 is partially bored out from the other end, and the bored out portion is screw-threaded, as shown at 23, and has mounted therein the correspondingly screw-threaded end of a horizontally extending pin 24 which shall, for purposes of convenience, be designated as the lever supporting element. On this lever supporting element 24 is fixedly mounted a handle 25 by means of which it is adapted to be rotated and the extent of its screw-threaded relation with the inner face of the hollow pin 22 accurately regulated. The hollow plug 22 is maintained in contact with the end of the porcelain rod 16 at all times by means of a leaf spring 26 acting upon the outer end thereof, and maintained in operative relation therewith by means of a screw or the like, 27. The plug 22 is likewise provided with a pair of pins 28 which project therefrom and enter into corresponding openings in the spring 26 so that the plug 22 is held against rotation with respect to the retaining plug 20.

The outer end of the pin or lever supporting member 24, which may be in two parts, extends through a suitable opening or bearing in the frame fixed upon the outside of the oven or other heating element and securely attached thereto in parallel relation with the wall thereof. As will be best shown in Fig. 4, the frame 30 is provided at its upper end with a semi-circular scale 31 over which the handle 25 is adapted to move while being swung upon the lever supporting pin 24. The scale 31 is graduated into degrees of heat corresponding to the range through which the oven is to be operated, and having thereon words or numbers at which the pointer of the handle 25 may be positioned according to the temperature to be maintained. As here illustrated, the operating range of the oven is from 225° F. to 550°, and the scale is correspondingly divided, but it will be obvious that any other degrees of heat may be attained and automatically maintained by this device, and that the divisions of the scale need not be equal at all times, but will depend to some degree, upon the relative expansion or contraction of the thermostatic element 14—16.

Suspended upon the lever supporting member 24 is the thermostat lever 32, having a counterbored opening 33 extending therethrough provided for the reception of the supporting member 24. A collar 34 or the like is provided on the supporting pin 24 whereby the lever 32 is maintained in proper relation therewith, and the upper face or end of the lever 32 is flattened, as shown at 35, and is adapted to bear against the transversely extending pin 36 securely mounted in openings in the upper end of the frame 30, and which pin forms the fulcrum about which the lever 32 is adapted to operate. The frame 30 is provided with a removable cap 37 at the upper end thereof, through which the lever supporting member 24 operates, and by means of which the assembling of the upper part of the structure can be conveniently made or accomplished. The end of the plug 20 bears against a knife edge positioned at the supporting point of the lever 32.

As best shown in Fig. 5, the vertical frame 30 has a horizontally extending portion 38 at about midway the height thereof, with its end in cylindrical form and adapted for the screw-threaded reception of a gas supply pipe 39. A flexible gas conducting tube 40 extends through the inner end of the screw-threaded nipple on the end of the pipe extension 38, and is provided at its end with a flange 41 adapted to cooperate with a gasket of rubber or other material between said flange and the end of the gas supply pipe 39. A plug 43, screw-threaded to correspond with the interior face of the nipple on the end of the pipe 38 is provided, adapted to securely maintain the flange 41 on the tube 40 in cooperative relation with the gas intake pipe 39, and sockets 44 or other convenient means are provided in the end of the plug 43, adapted for the ready insertion of a wrench or other means adapted to secure the same in the pipe 38.

As best shown in Figs. 1 and 7, the flexible pipe 40 extends downwardly to the lower end of the frame 30, and has its end soldered or otherwise securely and non-leakably attached into a boss 45 on the valve member 46.

The lower end of the frame 30 is open, as shown at 47, in Figs. 1 and 7, thereby providing an intake for air to be mixed with the gas coming through the tube 40. This open construction also prevents the condensation of gas and formation of scale which takes place in closed gas-tight housings of other construction, all of which impairs the efficient operation. A convenient bell burner 48, or any other desired burner is attached inside the oven 12, and adapted to extend thereinto is the gas nozzle 49, which consists of a tube fixedly mounted in a corresponding opening in an inwardly extending boss 50, which boss 50 forms part of the frame 30 of the thermostatic regulating element. The pivotal mounting of the tube 49 is accomplished by means of a transversely extending pin 51, as shown in Fig. 9, which is mounted in the boss 50, and extends through the gas tube or nozzle 49. The inner end of the gas tube 49 is provided with a valve seat as shown at 52 in Fig. 9, and adapted to slide on the tube or nozzle 49 is the main valve member 46 heretofore described, and which has soldered thereto the end of the flexible gas conducting tube 40. The slidable member 46 has provided thereon an annular extension having rounded faces, as shown at 54, in Figs. 10 and 11, against which the lower end of the lever 32 is adapted to operate, the lever being fork shaped, as shown at 55 in Fig. 3, so as to provide for a positive operation of the slidable valve member 46. The inner face of the slidable valve member 46 is provided with alternate ribs 56 and depressions 57 extending longitudinally thereof, through which the gas from the pipe 40 is adapted to flow freely to the valve seat 52 on the end of the pivoted tube 49.

A cap 60 is removably fitted upon the lower end of the frame 30, and extends laterally therefrom, being maintained in position thereon by means of screws 61. Adapted to extend into this cap is a housing 62 with a flat base, having screw-threaded connection with the slidable valve member 46, and including a tubular extension coacting with the cap 60, and having extending through the rear face thereof a screw-threaded bolt or pin 63, with a nut 64 at its outer end adapted to maintain the same in relation with the rear end of the housing 62. Attached at one end to a corresponding eye 65 on the pin 63 is a helical spring 66 having at its other end and fitted thereto by a corresponding eye, a conical valve member 67 adapted to cooperate with the valve seat 52 of the tube 49. The valve member 67 has its flat face slidable over the corresponding flat face of the base forming part of the screw-threaded connection between the tubular element 62 and the valve member 46, and the elasticity of the spring 66 will therefore permit of an accurate automatic seating of the valve member 67 in the valve seat 52 regardless of slight variations in their original contact with each other, due to the arc through which the end of the lever 32 swings, and to differences resulting from contraction or expansion. A spring 68 is provided between the inner face of the cap 60, and the outer face of the valve holding tubular housing 62 whereby the said housing 62, together with its attached screw-threaded valve member 46 is normally maintained at one end of its slidable relation with the gas nozzle or tube 49, and the conical plug 67 is maintained in contact with the valve seat 52. A small opening 70 is made through the conical plug 67, and has its termination at the apex of said plug, so that a minute quantity of gas is always allowed to flow into the nozzle 49, regardless of the closed position of the valve, so that any danger of back-firing in the bell burner 48 is prevented.

As will be seen from an inspection of Figs 1 and 3, the downwardly extending forked arms 55 of the thermostat lever 32 are bent forwardly to bear against the inner faces 54 of the slidable valve member 46, thereby tending to push the same rearwardly against the action of the spring 68 upon the contraction of the thermostat tube 14, and the flexible tube 40 enters the boss 45 at a point in front of the downwardly extending arm of the lever 32, but behind the rear faces of the forks 55, so that the slidable valve member 46 is at all times constrained to move in practical conjunction with the thermostat lever 32.

The operation is as follows: Suppose the regulating lever of handle 25 to be set to a low temperature operating position, as shown in the full lines in Fig. 4. The screw-threaded end of the lever supporting pin 22 will then have entered to quite a considerable degree, or almost to the extent of its action, into the corresponding screw-threaded opening in the plug 42, thereby allowing the lever 32 to swing forwardly, and permitting the spring 68 to push the valve member 46—62 into a position forward and towards the oven 12, thereby practically closing the flow of gas through the tube 49 on account of the fit of the plug 67 upon the seat 52. The relation between the various parts of the device is so adjusted that just sufficient gas will now be allowed to flow through between the valve 67 and the seat 52 to maintain the oven at the lowest temperature on the scale, say, 225° F. If there happens to be a tendency for more gas to flow through the valve opening on account of greater pressure, or the like, the copper tube 14 will expand, thereby drawing back the non-expandible porcelain rod 16 and allowing the spring 68 to further close the valve, thereby shutting off part of the supply of gas, and cooling the oven. If the temperature drops too much, the tube 14 will contract, thereby opening the valve slightly, and maintaining the temperature at the predetermined point. Now supposing the adjusting lever 25 is moved to the other extremity of its motion, say 550° F., it will be evident that the screw-threaded end of the pin 24 will be withdrawn considerably from the socket in plug 22, thereby pushing against the face of the lever 32 contiguous to the pin 24, pivoting the same about the focus point 36 against the tension of the spring 68, and opening the valve to its fullest extent. This will allow a considerable quantity of gas to flow through, and the oven will be heated up correspondingly. At the same time the thermostat element 14—16 is acting as explained above, and when the required degree of temperature is attained, the rod 16 will be drawn back sufficiently to enable the spring 68 to act to slightly close the valve 67—52, thereby regulating the flow of gas and maintaining the temperature at the desired point.

It will be evident that herein is provided a thermostatic regulator for gas ovens, wherein all possibilities of leakage are eliminated, as the tube for conducting the fuel through the automatically operated valve is flexible, and is moved with the valve itself, instead of forming the housing, or having the housing forming a part of the tube whereby leaks are unavoidable. Further, there is hereby provided an adjustment for regulating the temperature which acts directly at the point of thermostat element contact with the valve adjusting lever, thereby leaving the fulcrum of the lever in an undisturbed position at all times which greatly increases the effectiveness and operating convenience of the device. Again, the valve for regulating the flow of gas is automatically self-seating, and any variation, due to the arc through which the thermostat lever 32 swings, and also due to expansion or contraction of the same, due to heat or cold, will be automatically overcome and the correct seating of the valve effected at all times.

I am aware that many changes may be made and numerous details of construction varied throughout a wide range, without departing from the principles of this invention, and I therefore do not purpose limiting the patent granted hereon otherwise than as necessitated by the prior art.

I claim as my invention:

1. An automatic fuel cutoff including a fuel control means normally spring closed, a lever engaging said fuel control means, a fulcrum upon which said lever moves, thermostatic means for controlling the lever, and a flexible fuel supply means mounted in conjunction with said lever and adapted to be moved thereby.

2. An automatic fuel cutoff including a fuel control means normally spring closed, a lever engaging said fuel control means, a fulcrum upon which said lever moves, thermostatic means for controlling the lever, and a flexible fuel supply means mounted in conjunction with said lever and adapted to move therewith, and connected at its end with the fuel control means.

3. In combination with an oven, a thermostatic element in the oven, a lever fulcrumed on the outside of the oven and adapted to be operated on by said thermostatic element, a gas burner communication extending into the oven adjacent the lower end of said lever, and a valve for the gas communication, said valve including a relatively fixed nozzle, a slidable element on said nozzle, and a flexible fuel supply means communicating with said slidable element.

4. In combination with an oven, a thermostatic element in the oven, a lever fulcrumed on the outside of the oven and adapted to be operated on by said thermostatic element, a gas burner communication extending into the oven adjacent the lower end of said lever, and a valve for the gas communication, said valve including a relatively fixed nozzle, a valve seat on said nozzle, a slidable element on said nozzle, said slidable element being spring impelled into operative relation with the lower end of the thermostatic lever.

5. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a valve seat on said nozzle, a slidable element on said nozzle, said slidable element being spring impelled into operative relation with the lower end of the thermostatic lever, and a self-aligning valve member adapted to cooperate with the seat on the end of the tube nozzle.

6. In combination with an oven, a thermostatic element in the oven, a lever fulcrumed on the outside of the oven and adapted to be operated on by said thermostatic element, a gas burner communication extending into the oven adjacent the lower end of said lever, and a valve for the gas communication, said valve including a relatively fixed nozzle, a slidable element on said nozzle, said slidable element being spring impelled into operative relation with the lower end of the thermostatic lever, to gether with manually adjustable means for regulating the relation between the thermostatic element and the pivoted lever.

7. In combination with an oven, a thermostatic element in the oven, a lever fulcrumed on the outside of the oven and adapted to be operated on by said thermostatic element, a gas burner communication extending into the oven adjacent the lower end of said lever, and a valve for the gas communication, said valve including a relatively fixed nozzle, a slidable element on said nozzle, said slidable element being spring impelled into operative relation with the lower end of the thermostatic lever, together with manually adjustable means for regulating the relation between the thermostatic element and the pivoted lever, said manually adjustable means acting on the pivotal point of said lever.

8. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a slidable element on said nozzle, said slidable element being spring impelled into operative relation with the lower end of the thermostatic lever, together with manually adjustable means for regulating the relation between the thermostatic element and the pivoted lever, and an indicator scale over which said manually adjustable means is adapted to move, a handle movable over the scale, said handle being mounted at the pivot at point of the lever and a screw-threaded connection between the handle and the thermostat element.

9. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a slidable element on said nozzle, said slidable element being spring impelled into operative relation with the lower end of the thermostatic lever, together with manually adjustable means for regulating the relation between the thermostatic element and the pivoted lever, and an indicator scale over which said manually adjustable means is adapted to move.

10. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a valve seat on said nozzle, a slidable element on said nozzle, said slidable element being spring impelled into operative relation with the lower end of the thermostatic lever, and a self-aligning valve member adapted to cooperate with the seat on the end of the tube nozzle, said self-aligning valve including a conical element adapted to cooperate with the valve seat.

11. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a valve seat on said nozzle, a slidable element on said nozzle, said slidable element being spring impelled into operative relation with the lower end of the thermostatic lever, a self-aligning valve member adapted to cooperate with the seat on the end of the tube nozzle, said self-aligning valve including a conical element adapted to cooperate with the valve seat, and a support for said conical element comprising a flat face in the slidable member over which said conical element is movable in a plane parallel to the plane of the valve seat.

12. In combination with an oven, a thermostatic element in the oven, a lever fulcrumed on the outside of the oven and adapted to be operated on by said thermostatic element, a gas burner communication extending into the oven adjacent the lower end of said lever, a valve for the gas communication, said valve including a relatively fixed nozzle, a valve seat on said nozzle, a slidable element on said nozzle, said slidable element being spring impelled into operative relation with the lower end of the thermostatic lever, a self-aligning valve member adapted to cooperate with the seat on the end of the tube nozzle, said self-aligning valve including a conical element adapted to cooperate with the valve seat, and resilient means for maintaining said conical valve element in position on the face.

13. In a gas oven, a burner for heating the oven, a fuel valve for the burner, including a fixed and a movable part, a thermoactuated member operatively connected with the movable part of the fuel valve, and a flexible gas supply means leading into the movable part of the fuel valve.

14. In a gas oven, a burner for heating the oven, a fuel valve for the burner, a thermoactuated member operatively connected with the fuel valve, and a flexible gas supply means leading into the fuel valve, and movable in the operation thereof by the thermoactuated member.

15. In a thermostat element a readily expandible tube, a negative non-expansible element associated therewith, a flange on the end of said tube, and means for maintaining said thermostat element in desired position, said means comprising a frame, a hollow boss on the frame, an annular extension in the end of said boss against which the flange is adapted to rest, screw threads on the interior of said boss, a corresponding screw-threaded plug adapted to be positioned in said boss, and against the flange on the tube, a cylindrical opening in the plug, a recessed plug slidable in said opening, having its end adapted to contact with the end of the negative element of the thermostat, resilient means for maintaining the recessed plug in contacting position, screw threads on the interior of said plug a corresponding element screw-threaded at one end, adapted to cooperate therewith, a pivoted lever controlled by the thermostat element, the outer end of said screw-threaded element adapted to bear against the pivoted lever, and manually adjustable means for changing the relation between the pivoted lever and the screw-threaded element.

16. In a thermostat element a readily expandible tube, a negative non-expansible element associated therewith, a flange on the end of said tube, and means for maintaining said thermostat element in desired position, said means comprising a frame, a hollow boss on the frame, an annular extension in the end of said boss against which the flange is adapted to rest, screw threads on the interior of said boss, a corresponding screw-threaded plug adapted to be positioned in said boss, and against the flange on the tube, a cylindrical opening in the plug, a recessed plug slidable in said opening, having its end adapted to contact with the end of the negative element of the thermostat, resilient means for maintaining the recessed plug in contacting position, screw-threads on the interior of said plug a corresponding element screw-threaded at one end adapted to cooperate therewith, a pivoted lever controlled by the thermostat element, the outer end of said screw-threaded element adapted to bear against the pivoted lever, manually adjustable means for changing the relation between the pivoted lever and the screw-threaded element, and means for maintaining the recessed screw-threaded plug against rotation in the plug, said means including lugs extending into said pin, said lugs cooperating with the resilient means provided to maintain the pin in position.

17. A thermostatically controlled valve for gas ovens including a gas delivery nozzle in the form of a tube, a valve seat on one end of said tube, a slidable gas delivery means including a self-aligning valve closing member adapted to cooperate with the seat, said mounted on the tube self-aligning valve member including a conical element slidable on its base in the plane parallel to the plane of a valve seat, and resilient means for maintaining the valve member in said plane.

In testimony whereof I affix my signature.

HUBERT A. BARSCHOW.